United States Patent [19]

Itoh

[11] Patent Number: 5,035,497
[45] Date of Patent: Jul. 30, 1991

[54] MIRROR SUPPORTING DEVICE

[75] Inventor: Noboru Itoh, Hyogo, Japan

[73] Assignee: Mitsubishi Denki Kabushiki Kaisha, Tokyo, Japan

[21] Appl. No.: 540,724

[22] Filed: Jun. 20, 1990

[30] Foreign Application Priority Data

Jun. 26, 1989 [JP] Japan .................................. 1-163464

[51] Int. Cl.⁵ .............................................. G02B 7/18
[52] U.S. Cl. .................................... 350/611; 350/607
[58] Field of Search ................ 350/487, 607, 609, 611

[56] References Cited

U.S. PATENT DOCUMENTS 4,500,170  2/1985  Montesanto ......................... 350/611
4,664,488  5/1987  Sawicki et al. ...................... 350/607

OTHER PUBLICATIONS

Knohl, "A New Discrete Lateral Support for Thin Monolithic Mirrors of the 8m Class", ESO Conference on Very Large Telescopes and Their Instrumentation, Garching, Mar. 21-24, 1988, pp. 505-514.

Primary Examiner—Bruce Y. Arnold
Assistant Examiner—J. P. Ryan
Attorney, Agent, or Firm—Rothwell, Figg, Ernst & Kurz

[57] ABSTRACT

In a mirror supporting apparatus, a lever pivots the center of gravity of the mirror, whereby performing exactly the same motion with respect to a mirror provided with a universal joint at the center of gravity of the mirror. Therefore, the same effect as that of conventional mechanism is obtained without provision of a hole in the mirror. Furthermore, a counter weight is secured to the mirror so as to position a substantial center of gravity of the mirror outside of the mirror, whereby obtaining a similar effect.

8 Claims, 6 Drawing Sheets

MIRROR SUPPORTING DEVICE

BACKGROUND OF THE INVENTION

1. Field of the Invention

This invention relates to a mirror supporting device for supporting a mirror in a suitable attitude while maintaining a mirror surface in a predetermined shape by compensating for an influence of gravity.

2. Description of the Prior Art

Figures 1, 2:
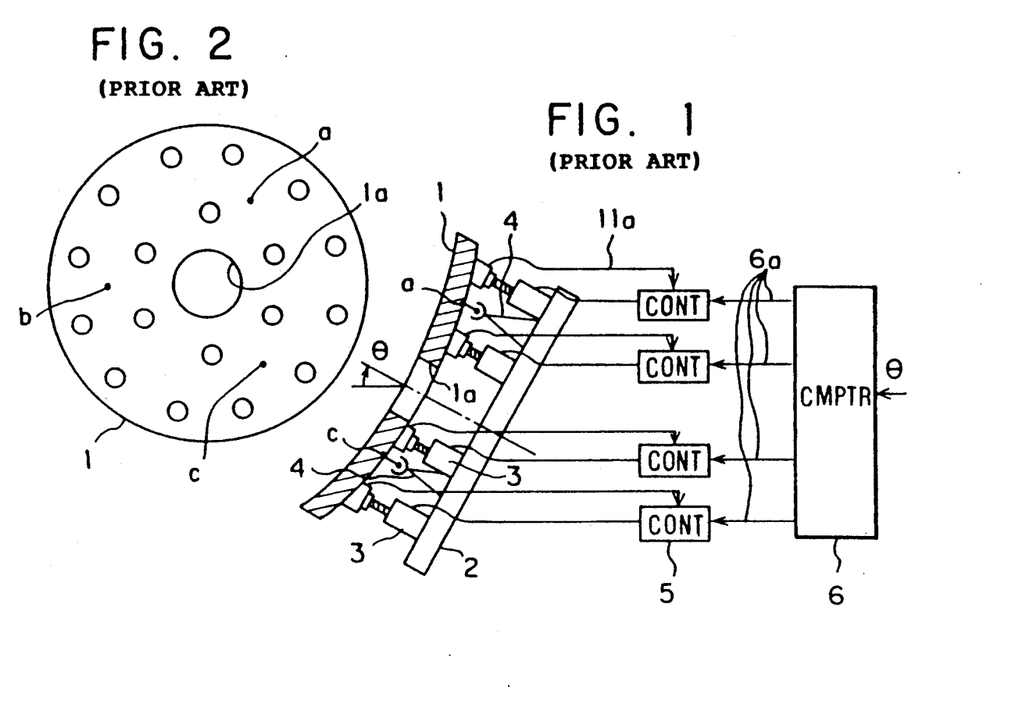
FIG. 1 is a structural view showing a conventional mirror supporting system.
FIG. 2 is a plan view of a mirror.

FIG. 1 is a structural view showing a mirror supporting system using a conventional mirror supporting device; FIG. 2 is a plan view showing a mirror supported at a suitable angle θ of inclination by said mirror supporting device; and FIG. 3 is a structural view showing a conventional mirror supporting device.

In FIG. 1, reference numeral 1 designates a spherical mirror made of glass having a concave mirror surface, the mirror 1 having a hole 1a in a central portion thereof and being secured at three fixing points a, b and c as also shown in FIG. 2. Reference numeral 2 designates a mirror cell for supporting the mirror 1; 3 a plurality of mirror supporting devices for supporting the mirror 1 in a suitable attitude on the mirror cell 2; 4 a mirror fixing mechanism for fixing the mirror 1 at said fixing points a, b and c on the mirror cell 2; 5 a plurality of force control devices for controlling a support force of each of the mirror supporting devices 3 in accordance with a force command value 6a and a detection signal 11a from an axial support force detector (described later) provided on each of the mirror supporting devices 3; and 6 a force command value calculating device for calculating said force command value 6a applied to each control device 5 in response to said angle of inclination θ.

Figure 3:
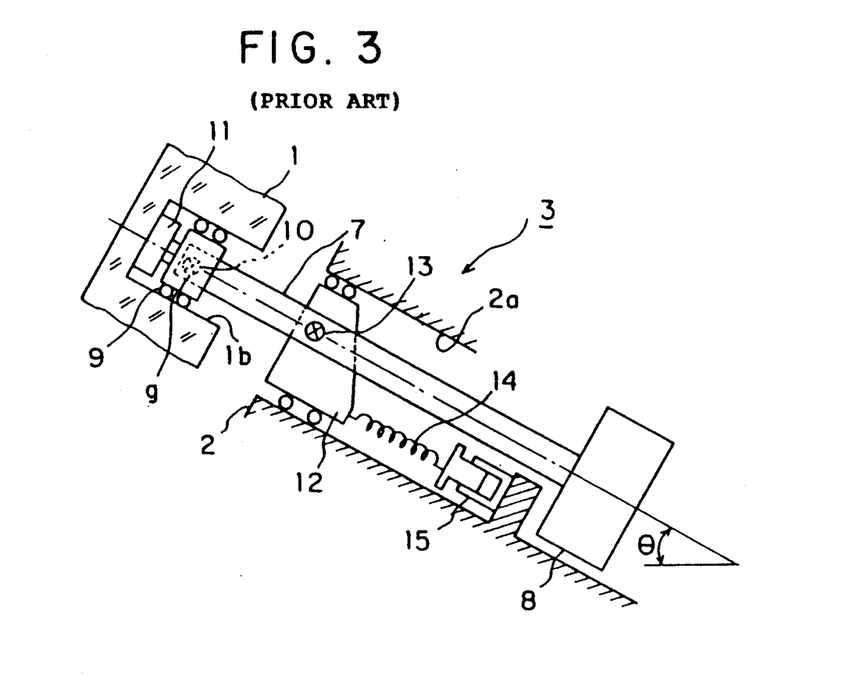
FIG. 3 is a structural view showing a conventional mirror supporting apparatus.

In FIG. 3 showing the aforesaid mirror supporting device 3, reference numeral 1b designates a recess portion provided in the back surface of the mirror 1; 2a a recess portion provided in the mirror cell 2; 7 a lever provided in the recess portion 2a and extending to the recess portion 1b; 8 a counter weight provided on one end of the lever 7; 12 a guide mechanism provided movably in an axial direction of the lever 7 within the recess portion 2a; 13 a universal joint for connecting an intermediate portion of the lever 7 to the guide mechanism 12; 14 a spring connected to the guide mechanism 12; 15 a ball-screw device with a motor controlled by the force control device 5 shown in FIG. 1, for enabling the guide mechanism 12 together with the lever 7 to move via the spring 14; 9 a guide mechanism provided movably in an axial direction of the lever 7 within the recess portion 1b; 10 a universal joint for connecting the other end of the lever 7 to the guide mechanism 9 at the center of gravity g of the mirror 1; and 11 an axial support force detector provided in the recess portion 1b to detect an axial support force.

The apparatus operates as follows.

First, in FIG. 2, the mirror 1 is fixed to the mirror cell 2 at three fixing points a, b and c by the mirror fixing mechanisms 4. In order to prevent own-weight deformation of mirror 1 caused by gravity, a plurality of mirror supporting devices 3 are provided to generate a force in a direction of counteracting the mirror's own weight. Each mirror supporting device 3 is controlled by a force control device 5 so as to provide a force corresponding to the imparted force command value 6a. What support force should be generated in each of the mirror supporting devices 3 is determined by the force command value calculating device 6 in response to the angle of inclination θ of the mirror 1.

Next, the principle of the mirror supporting device 3 shown in FIG. 3 will be described.

Since the mirror 1 is inclined to a suitable attitude, it is necessary to apply forces of two directions in order to counteract the weight of the mirror 1. One is a force at right angle to the surface of mirror 1 (axial force), and the other is a force in a planar direction of the mirror 1 (radial force). First, how the radial force is generated will be described.

Assuming W is a shared weight of the mirror 1 being charged upon each mirror supporting device 3, the lever ratio of the lever 7 (the ratio between the distance from the universal joint 10 to the universal joint 13 and the distance from the universal joint 13 to the counter weight 8) and the weight of the counter weight 8 are then determined so as to provide a force equal to W. Each universal joint 10 can be supported in the recess portion 1b provided in the mirror 1 so as to be positioned at the center of gravity g of the mirror 1 to thereby counteract the radial force acting on the mirror 1 due to gravity.

With respect to the counteract axial force, a force is generated by the spring 14 and the ball-screw device with motor 15, and the force is transmitted to the mirror 1 through the guide mechanism 12, the universal joint 13, the lever 7, the universal joint 10, the guide mechanism 9 and the axial support force detector 11. The detection signal from the axial support force detector 11 is fed back to the force control device 5, and the force control device 5 controls the ball-screw device with motor 15 so that the axial support force becomes equal to the gravitational axial force, as determined by force command value 6a.

Since the conventional mirror supporting device 3 is constructed as described above, the recess portions 1b have to be provided in the mirror 1 in order to support the mirror 1 at its center of gravity g. Thus, difficult processing is required in which the mirror 1 made of glass is bored with holes to form the recess portions 1b. In addition, there involved problems such that cracks remain even after processing, and the reliability in strength is materially lowered.

SUMMARY OF THE INVENTION

This invention has been made in order to overcome the problems as noted above. An object of this invention is to provide a mirror supporting apparatus which can obtain the same effect as that the center of gravity of the mirror is carried without making a hole in the mirror.

In the mirror supporting apparatus according to one aspect of this invention, a connection means that enables a lever to pivot about the center of gravity of the mirror is provided outside the thickness of the mirror.

In the mirror supporting apparatus according to another aspect of this invention, a new counter weight is mounted on the mirror, and the composite center of gravity of the mirror and the counter weight is positioned outside the thickness of the mirror.

The above and other objects and novel features of this invention will become more fully apparent from reading the ensuing detailed description in conjunction with the accompanying drawings.

DETAILED DESCRIPTION OF THE PREFERRED EMBODIMENTS

The first to sixth embodiments of this invention will be described with reference to the drawings. Parts in FIGS. 4 to 12 corresponding to those shown in FIGS. 1 to 3 are indicated by the same reference numerals, repeated description of which is omitted.

Figure 4:
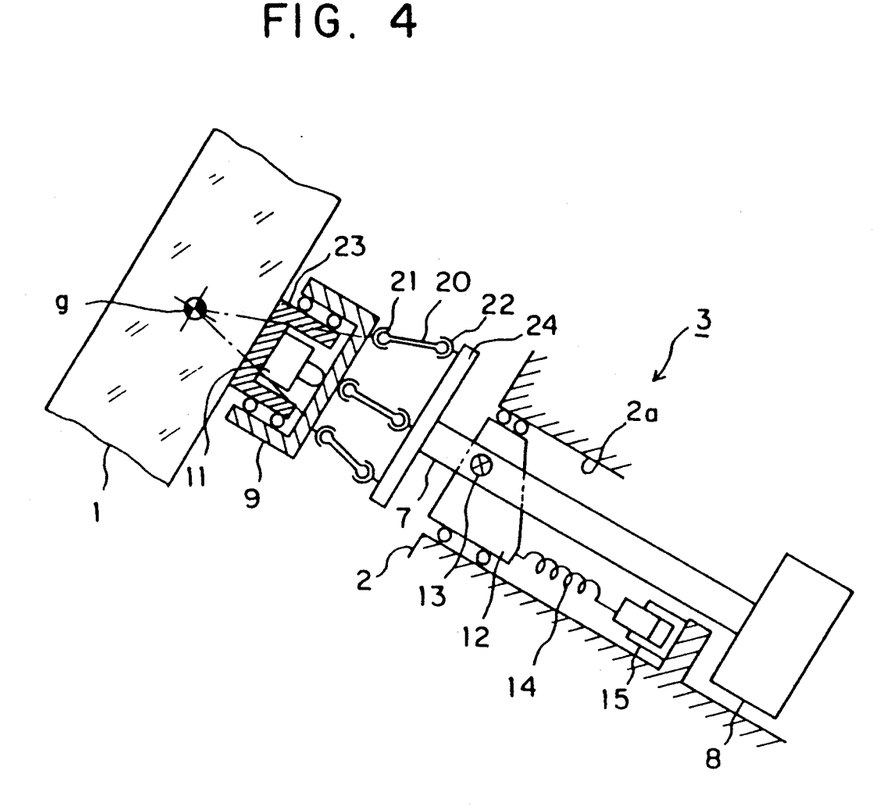
FIG. 4 is a structural view showing a mirror supporting apparatus according to a first embodiment of this invention.
Figure 5:
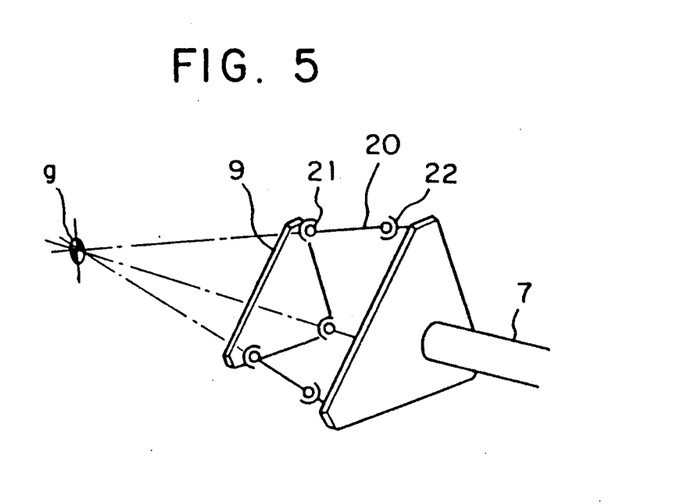
FIG. 5 is a perspective view of essential parts of the apparatus.

FIGS. 4 and 5 show a first embodiment. Reference character g designates a center of gravity of the mirror 1. Reference numeral 23 designates a support member secured to the back surface of the mirror 1, in which an axial support force detector 11 is provided, and a guide mechanism 9 is mounted movably in an axial direction. It is noted that the guide mechanism 9 shown in FIG. 4 is different in shape from the guide mechanism 9 shown in FIG. 3 but has the same function. Reference numeral 24 designates a support bed provided at an extreme end of the lever 7; 21 are spherical bearings provided at three locations on the back surface of the guide mechanism 9 as shown in FIG. 5; 22 are spherical bearings provided at three locations of the support bed 24 as shown in FIG. 5; and 20 is a link for connecting the spherical bearings 21 and 22. In FIG. 5, only a part of the guide mechanism 9 is shown. Each of the links 20 is arranged so that an extending line thereof, that is, a line connecting two spherical bearings 21 and 22 passes through the center of gravity g of the mirror 1.

Connection means for connecting the lever 7 to the support member 23 comprises the guide mechanism 9, the links 20 and the spherical bearings 21 and 22 so as to enable the lever 7 to pivot about the center of gravity g of the mirror.

The apparatus operates as follows.

In FIGS. 4 and 5, the guide mechanism 9 mounted on the support member 23 and the support bed 24 mounted on the lever 7 are rotatably connected through the three sets of spherical bearings 21, 22 and links 20, and the extending line of each link 20 passes through the center of gravity g of the mirror 1. Thereby, the lever 7 pivots about the center of gravity g of the mirror 1, and the effect equivalent to the prior art is obtained. That is, in the prior art, the universal joint 10 is disposed at the center of gravity g of the mirror, as shown in FIG. 3, and the lever 7 is connected thereto. Substantially the same function is obtained.

Figure 6:
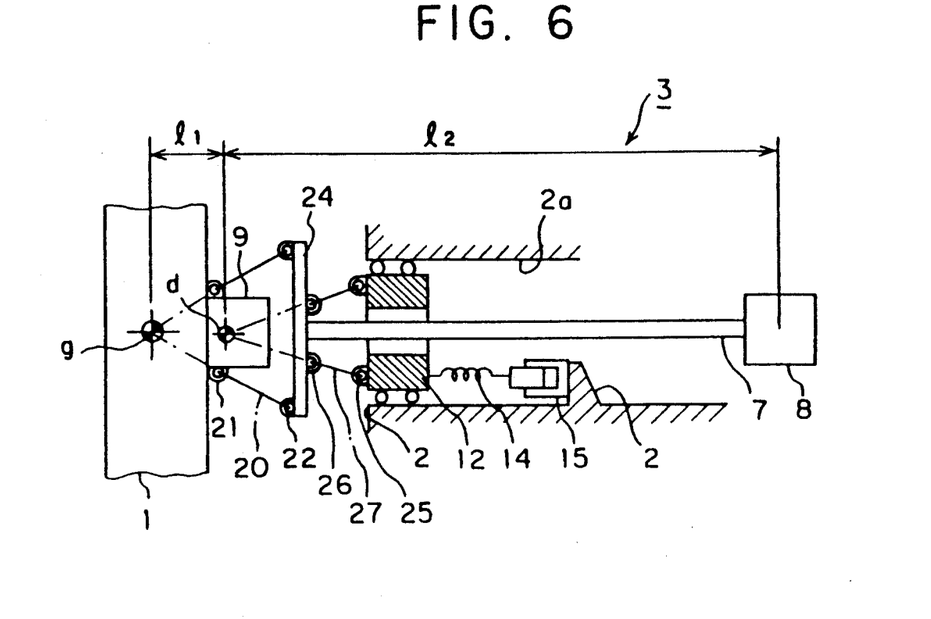
FIG. 6 is a structural view showing a mirror supporting apparatus according to a second embodiment of this invention.

FIG. 6 shows a second embodiment.

The support bed 24 and the guide mechanism 9 are rotatably connected through two spherical bearings 21, 22 and link 20, in a manner similar to the embodiment of FIG. 4. In FIG. 6, the support member 23 shown in FIG. 4 is omitted and the connecting state is somewhat different from that of FIG. 4 but both the embodiments are substantially the same in structure. In addition, the universal joint 13 shown in FIG. 4 is omitted. The lever 7 is rotatably connected to the guide mechanism 9 through a plurality of spherical bearings 25 provided on the guide mechanism 12, the plurality of spherical bearings 26 provided on the support bed 24 and the plurality of links 27 connecting the spherical bearings 25 and 26. The extending line of each link 27 crosses at a point d in the guide mechanism 9.

In the second embodiment, the connection means comprises the guide mechanism 9, the support bed 24, the links 20 and 27, and the spherical bearings 21, 22, 25 and 26.

According to the aforementioned structure, the effect similar to that of the first embodiment is obtained. The aforesaid point d serves as an approximate support point of the lever 7. The lever ratio $l_1 : l_2$ of the distance $l_1$ between the point d and the center of gravity g of the mirror 1 to the distance $l_2$ between the point d and the counter weight 8 is selected to be small to thereby reduce the weight of the counter weight 8.

Figure 7:
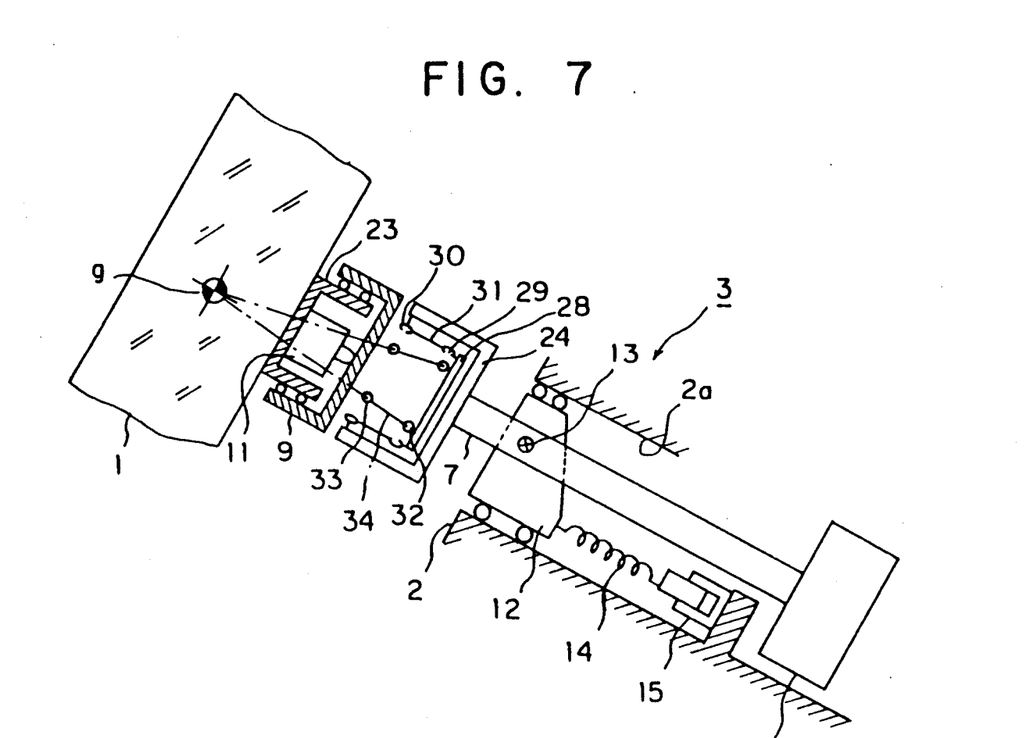
FIG. 7 is a structural view showing a mirror supporting apparatus according to a third embodiment of this invention.
Figure 8:
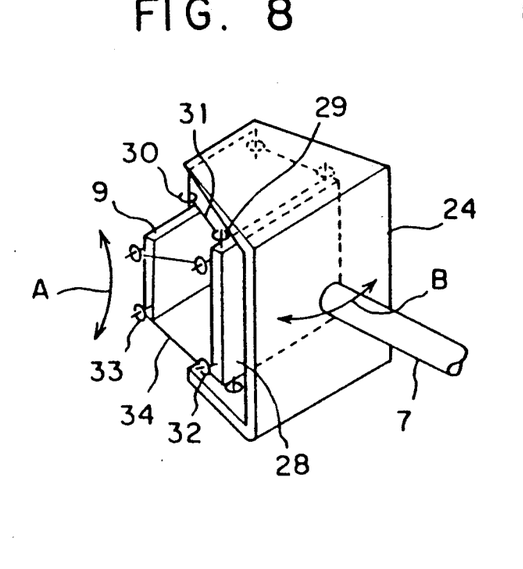
FIG. 8 is a perspective view of essential parts of the apparatus.

FIGS. 7 and 8 show a third embodiment.

In this embodiment, the support bed 24 has a U-shaped section, within which a support plate 28 is disposed. This support plate 28 is connected to the support bed 24 through a plurality of pin joints 29 provided on the support plate 28, pin joints 30 provided on the support bed 24 and links 31 for connecting these pin joints 29 and 30. By this connection, the support plate 28 is pivotable approximately in a vertical direction indicated at arrow A in FIG. 8 about the center of gravity g of the mirror 1. The support plate 28 is connected to the guide mechanism 9 through a plurality of pin joints 32 provided on the support plate 28, pin joints 33 provided on the guide mechanism 9 and links 34 for connecting these pin joints 32 and 33. By this connection, the lever 7 and the support bed 24 are pivotable in a lateral direction indicated at arrow B in FIG. 8 about the center of gravity g of the mirror 1. The extending line of each link 34 passes through the center of gravity g.

In the third embodiment, the connection means comprises the guide mechanism 9, the support bed 24, the support plate 28, the links 31, 34, and the pin joints 29, 30, 32 and 33.

According to the above-described structure, the lever 7 can be pivoted vertically and laterally about the center of gravity g of the mirror 1.

Figure 9:
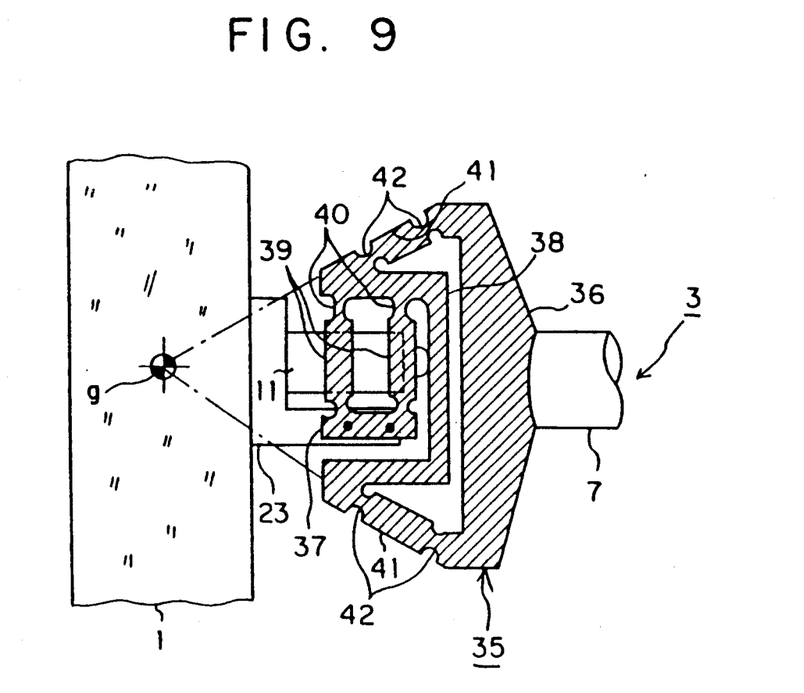
FIGS. 9 and 10 are structural views showing a mirror supporting apparatus according to fourth and fifth embodiments, respectively, of this invention.

FIG. 9 shows a fourth embodiment.

The fourth embodiment is a modified example of the third embodiment, in which parts having the same functions as those of the pin joints 29, 30, 32, 33, the links 31, 34, the support plate 28, the support bed 24, the guide mechanism 9 and the like shown in FIGS. 7 and 8 are integrally molded into a single resilient body 35.

In the resilient body 35, reference numeral 36 designates a mounting portion of the lever 7, 37 a mounting portion of the support member 23, and 38 a guide portion against which a part of the axial support force detector 11 mounted on the support member 23 butts. Reference 39 designates two links provided radially and parallelly, 40 notches provided on opposite ends of the link 39, 41 links provided so that extending lines thereof pass through the center of gravity g of the mirror 1, and 42 notches provided on opposite ends of the link 41.

In the fourth embodiment, the connection means comprises the resilient body 35 in which parts thereof are integrally molded.

According to the aforementioned structure, the notch portions 40 and 42 provided in the links 39 and 41 are deformed whereby the notches 40 and 42 act similarly to the pin joints. The guide portion 38 is deformed and moved in an axial direction whereby the guide portion 38 acts similarly to the guide mechanism 9. Accordingly, the lever 7 can be pivoted vertically and laterally about the center of gravity g. According to this embodiment, the number of parts can be reduced.

Figure 10:
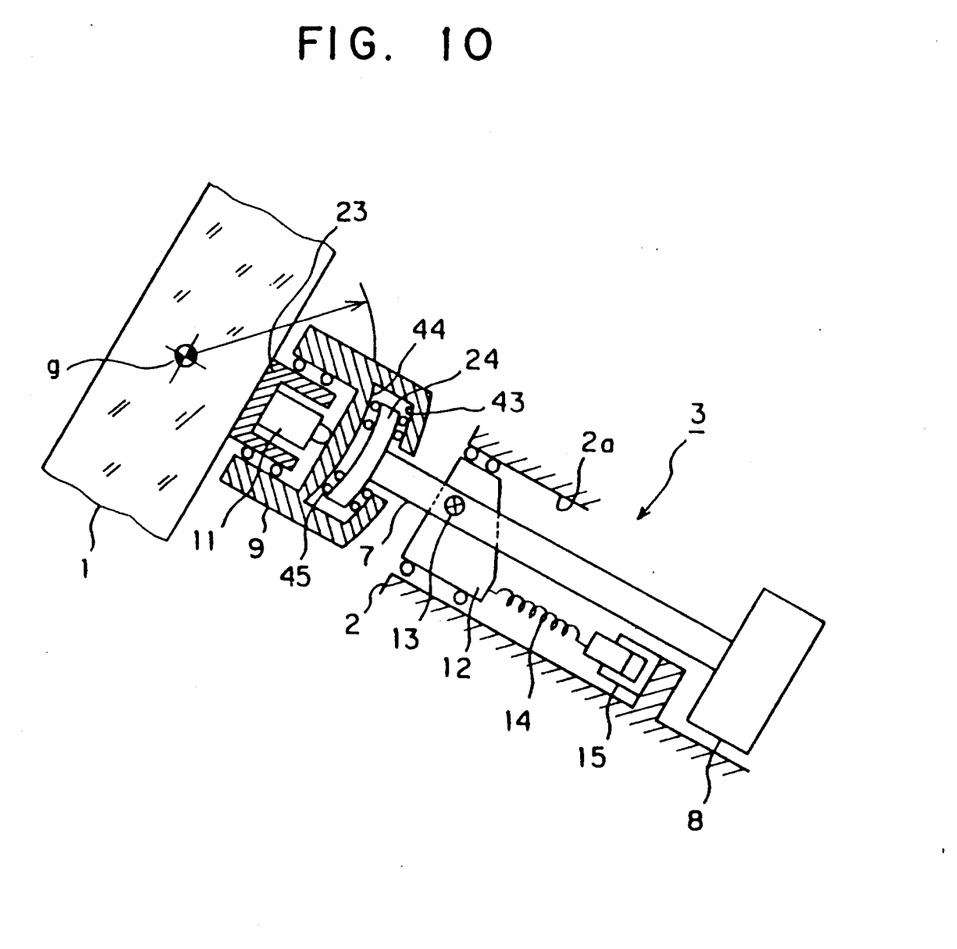

FIG. 10 shows a fifth embodiment.

In this embodiment, spherical surfaces 43 and 44 whose center is the center of gravity g are provided within the guide mechanism 9 in parallel with each other, and the support bed 24 is disposed between the spherical surfaces 43 and 44 through a rolling mechanism 45.

The connection means comprises the guide mechanism 9, the spherical surfaces 43 and 44, the support bed 24 and the rolling mechanism 45.

With the above-described structure, the lever 7 pivots about the center of gravity g of the mirror 1, and therefore, the same effect as that of the prior art in which the mirror 1 is bored with a hole, the universal joint 10 is provided at the center of gravity g, and the lever 7 pivots about the center of gravity g of the mirror 1 is achieved.

Figure 11:
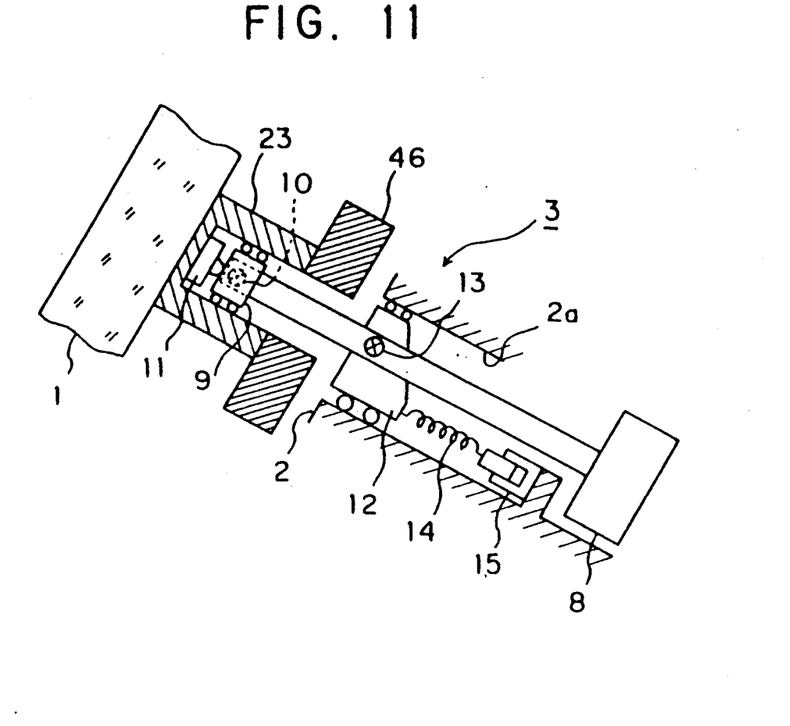
FIG. 11 is a structural view showing a mirror supporting apparatus according to a sixth embodiment of this invention.
Figure 12:
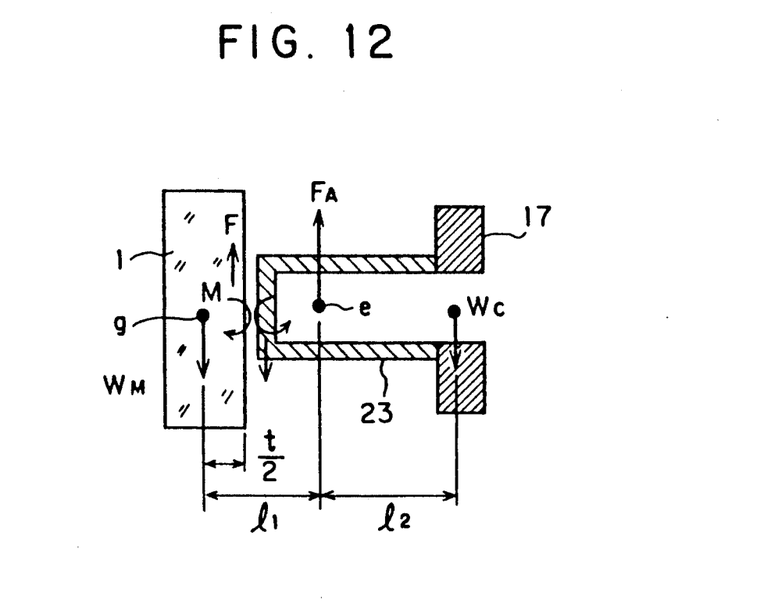
FIG. 12 is a structural view of essential parts of the apparatus.

FIGS. 11 and 12 show a sixth embodiment.

In this embodiment, the support member 23 is interiorly provided with the guide mechanism 9 and the axial support force detector 11. A counter weight 46 is provided on the support member 23.

Assuming $W_M$ is the weight of the mirror 1, and $W_C$ the weight of the support member 23 and the counter weight 46, the lever ratio ($l_1:l_2$) and the weight of the counter weight 46 are then set so as to cause a force being equal to $W_M + W_C$. As shown in FIG. 12, a center of rotation e of the universal joint 10 is positioned at a composite center of gravity of the mirror 1, the support member 23 and the counter weight 46.

In the sixth embodiment, the connection means comprises the guide mechanism 9 and the universal joint 10.

Supposing in this embodiment that a combination of the mirror 1, the support member 23 and the counter weight 46 corresponds to the mirror in the prior art, it is then apparent that the effect similar to that of the conventional apparatus is obtained.

That is, quantitatively, a shearing force $W_M$ and a moment $W_M \times t/2$ (where t represents a thickness of the mirror 1) are applied to the back surface of the mirror 1 to counteract the weight of the mirror 1. Quantitative description thereof will be given with reference to FIG. 12.

First, the shearing force F transmitted from the support member 23 to the mirror 1 is given by $$F = F_A - W_C$$

where, $F_A$: radial force from the mirror supporting apparatus 3.

Since the radial force $F_A$ from the mirror supporting apparatus 3 is set to $W_M + W_C$, the shearing force F is given by $$F = (W_M + W_C) - W_C = W_M.$$

Moment M transmitted from the support member 23 to the mirror 1 is given by $$\begin{aligned} M &= W_C \times (l_2 + l_1 - t/2) - F_A \times (l_1 - t/2) \\ &= W_C \times (l_2 + l_1 - t/2) - (W_M + W_C) \times (l_1 - t/2) \\ &= W_C \times l_2 - W_M \times l_1 + W_M + t/2 \end{aligned}$$

However, the composite center of gravity of the mirror 1, the support member 23 and the counter weight 46 is coincident with the position e of the universal joint 10, and therefore, $W_C \times l_2 - W_M \times l_1 = 0$, resulting in $$M = W_M \times t/2$$

That is, the force of gravity acting on the mirror 1 can be counteract.

As described above, according to the first aspect of this invention, the connection means which enables the lever to pivot about the center of gravity of the mirror is provided in the outside of the thickness of the mirror through the support member. Therefore, the same effect as that carrying the center of gravity of the mirror is obtained without disposing the universal joint in the inside of the thickness of the mirror. Thus, the mirror need not be provided with a hole, thus obtaining the effect that the reliability in strength of the mirror can be enhanced.

According to another aspect of the present invention, the counter weight is provided on the mirror through the support member, the composite center of gravity of these three elements is positioned in the outside of the thickness of the mirror, and the composite center of gravity is rotatably supported by the connection means. Therefore, the mirror need not be provided with a hole as similar to the above, and the effect of enhancing the reliability is obtained.

I claim:

1. A mirror supporting apparatus, comprising:
   a support member provided on the back surface of a mirror outside the entire thickness thereof;
   a mirror cell arranged opposite said support member;
   a lever provided on said mirror cell and extended toward a center of gravity of said mirror; and
   connection means for connecting said lever with said support member so as to enable said lever to pivot about said center of gravity of the mirror.

2. A mirror supporting apparatus according to claim 1, wherein said connection means comprises:
   a guide mechanism mounted movably in an axial direction of said lever, on said support member;
   a support bed secured to an extreme end of said lever; and
   a plurality of links, both ends of each of which supported by a spherical bearing secured to said guide mechanism and by a spherical bearing secured to said support bed respectively, for connecting said lever pivotably said center of gravity of the mirror.

3. A mirror supporting apparatus according to claim 1, wherein said connection means comprises:
a guide mechanism secured to said support member;
a support bed secured to an extreme end of said lever;
a plurality of links, both ends of each of which is supported by a spherical bearing secured to said mechanism and by a spherical bearing secured to said support bed respectively, for connecting said lever pivotably about said center of gravity of the mirror; and
a plurality of links, both ends of each of which is supported by a spherical bearing secured to said support bed and by a spherical bearing secured to a guide mechanism provided for said lever respectively, for connecting the guide mechanism of said lever rotatably around substantially an axial point of the lever.

4. A mirror supporting apparatus according to claim 1, wherein said connection means comprises:
a guide mechanism mounted, on said support member, movably in an axial direction of said lever;
a support bed having a section of U-shape secured to an extreme end of said lever,
a support plate arranged within a recess portion of said support bed,
a plurality of links, both ends of each of which is supported by a pin joint secured to said guide mechanism and by a pin joint secured to said support plate respectively, for connecting said support plate pivotably vertically pivotally with respect to an axial direction of said lever around the center of gravity of said mirror, and
a plurality of links, both ends of each of which is supported by a pin joint secured to said support plate and by a pin joint secured to said support bed, for connecting said support bed laterally pivotally with respect to the axial direction of said lever around the center of gravity of said mirror.

5. A mirror supporting apparatus according to claim 4, wherein said guide mechanism, said support bed, said support plate, said both pluralities of links and pin joints are integrally molded into a resilient body being equivalent to said connection means, whereby said resilient body connects said lever vertically and laterally pivotally with respect to the axial direction of said lever around the center of gravity of said mirror by being deformed resiliently.

6. A mirror supporting apparatus according to claim 1, wherein said connection means comprises:
a guide mechanism having a spherical connecting surface around the center of gravity of said mirror and mounted on said support member movably in an axial direction of said lever,
a support bed having a spherical connecting surface around the center of gravity of said mirror and secured to an extreme end of said lever, and
a rolling mechanism for connecting the spherical connecting surface of said guide mechanism and that of said support bed, and for enabling said lever to be pivotably about the center of gravity of said mirror.

7. A mirror supporting apparatus according to any one of claims 1 to 6, further comprising a counter weight, provided on said support member, for shifting an axial position of a substantial center of gravity formed by said mirror, said support member and said counter weight to an outside of the mirror.

8. A mirror supporting apparatus, comprising:
a support member provided on the back surface of a mirror;
a guide mechanism attached to said support member;
a mirror cell arranged opposite said guide mechanism;
a lever provided on said mirror cell and extended toward a center of gravity of said mirror; and
connection means for connecting said lever with said guide mechanism so as to enable said lever to pivot about said center of gravity of the mirror.

* * * * *

UNITED STATES PATENT AND TRADEMARK OFFICE
CERTIFICATE OF CORRECTION

PATENT NO. : 5,035,497
DATED : July 30, 1991
INVENTOR(S) : Noboru Itoh

It is certified that error appears in the above-identified patent and that said Letters Patent is hereby corrected as shown below:

Col. 2, line 25, delete "counteract" and insert therefor --counteracting--.

Col. 2, line 39, delete "the".

Col. 2, line 41, delete "Thus, difficult processing is" and insert therefor --Difficult processing is thus--.

Col. 6, line 27, delete "counteract." and insert therefor --counteracted.--.

Col. 6, line 68, delete "pivotably said" and insert therefor --pivotably about said--.

Col. 7, line 16, delete "rotatably around" and insert therefor --pivotably about--.

Col. 8, line 21, delete "pivotably" and insert therefor --pivotable--.

Signed and Sealed this

Twelfth Day of October, 1993

BRUCE LEHMAN

*Attest:*

*Attesting Officer*  *Commissioner of Patents and Trademarks*